United States Patent
Dorsey (10) Patent No.: US 11,834,308 B2
(45) Date of Patent: Dec. 5, 2023

(54) DUMP TRAILER SUPPORT ASSEMBLY (71) Applicant: Dorian Dorsey, Wasco, CA (US)

(72) Inventor: Dorian Dorsey, Wasco, CA (US)

(*) Notice: Subject to any disclaimer, the term of this patent is extended or adjusted under 35 U.S.C. 154(b) by 555 days.

(21) Appl. No.: 16/952,180

(22) Filed: Nov. 19, 2020

(65) Prior Publication Data

US 2022/0153239 A1 May 19, 2022

(51) Int. Cl.
*B66F 1/02* (2006.01)
*B60P 1/04* (2006.01)
*F16M 11/28* (2006.01)
*F16M 11/00* (2006.01)
*B62D 53/08* (2006.01)

(52) U.S. Cl.
CPC ............... *B66F 1/02* (2013.01); *B60P 1/045* (2013.01); *F16M 11/28* (2013.01); *B62D 53/0857* (2013.01); *F16M 11/00* (2013.01)

(58) Field of Classification Search
CPC ........... F16M 11/28; F16M 11/00; B66F 1/02; B60P 1/045; B62D 53/0857
See application file for complete search history.

(56) References Cited

U.S. PATENT DOCUMENTS

| | | | |
|---|---|---|---|
| 2,082,139 A | 6/1937 | Bassetti | |
| 5,520,360 A * | 5/1996 | Wensman | F16M 11/046 248/188.5 |
| 5,901,935 A * | 5/1999 | Lai | F16M 11/245 248/354.4 |
| 6,053,477 A | 4/2000 | Price | |
| 6,905,174 B1 | 6/2005 | Gilbertson | |
| 8,066,247 B2 * | 11/2011 | Spera | E04G 11/50 248/407 |
| 8,113,479 B1 | 2/2012 | O'Connell | |
| D656,289 S | 3/2012 | Crump | |
| 9,080,722 B2 * | 7/2015 | Ceravolo | F16M 11/26 |
| 9,446,743 B2 | 9/2016 | Madison | |
| 9,494,275 B2 | 11/2016 | Crump | |
| 11,028,962 B1 * | 6/2021 | Barrow | F16M 11/046 |
| 11,225,225 B2 * | 1/2022 | Di Biase | B66F 5/025 |
| 2008/0203265 A1 * | 8/2008 | Zhang | B25H 1/0007 248/352 |
| 2015/0308612 A1 * | 10/2015 | Chen | F16M 11/22 248/352 |
| 2016/0202111 A1 * | 7/2016 | Fahey | B66F 3/24 254/89 R |
| 2018/0347726 A1 * | 12/2018 | Anderson | F16L 3/1091 |
| 2019/0299943 A1 * | 10/2019 | Gregory | B60T 3/00 |
| 2020/0238990 A1 * | 7/2020 | Ma | B60W 30/18 |

* cited by examiner

Primary Examiner — Monica E Millner (57) ABSTRACT

A dump trailer support assembly for supporting a belly dump trailer when the belly dump trailer is not coupled to a tractor includes a box for positioning on a support surface beneath a belly dump trailer. A shaft is slidably integrated into the box such that the shaft can be slid upwardly or downwardly in the box. A support is coupled to the shaft for supporting a bottom of the belly dump trailer when the belly dump trailer is not attached to a tractor. Additionally, the support is comprised of a magnetized material to magnetically engage the bottom of the belly dump trailer and inhibit the belly dump trailer from sliding on the support.

10 Claims, 15 Drawing Sheets

DUMP TRAILER SUPPORT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to support devices and more particularly pertains to a new support device for supporting a belly dump trailer when the belly dump trailer is not coupled to a tractor. The support device has a magnetized support for magnetically engaging the belly dump trailer to inhibit the support device from shifting on the belly dump trailer. Additionally, the support device has an adjustable height.

(2) Description of Related Art Including Information Disclosed Under 37 CFR 1.97 and 1.98

The prior art relates to support devices including a variety of support brackets for supporting a dump box on a dump track in an elevated position. The prior art discloses a variety of telescopic trailer supports for supporting an uncoupled trailer. In no instance does the prior art disclose a trailer support that has a magnetized support to magnetically engage a trailer for supporting the trailer when the trailer is uncoupled to a tractor.

BRIEF SUMMARY OF THE INVENTION

An embodiment of the disclosure meets the needs presented above by generally comprising a box for positioning on a support surface beneath a belly dump trailer. A shaft is slidably integrated into the box such that the shaft can be slid upwardly or downwardly in the box. A support is coupled to the shaft for supporting a bottom of the belly dump trailer when the belly dump trailer is not attached to a tractor. Additionally, the support is comprised of a magnetized material to magnetically engage the bottom of the belly dump trailer and inhibit the belly dump trailer from sliding on the support.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
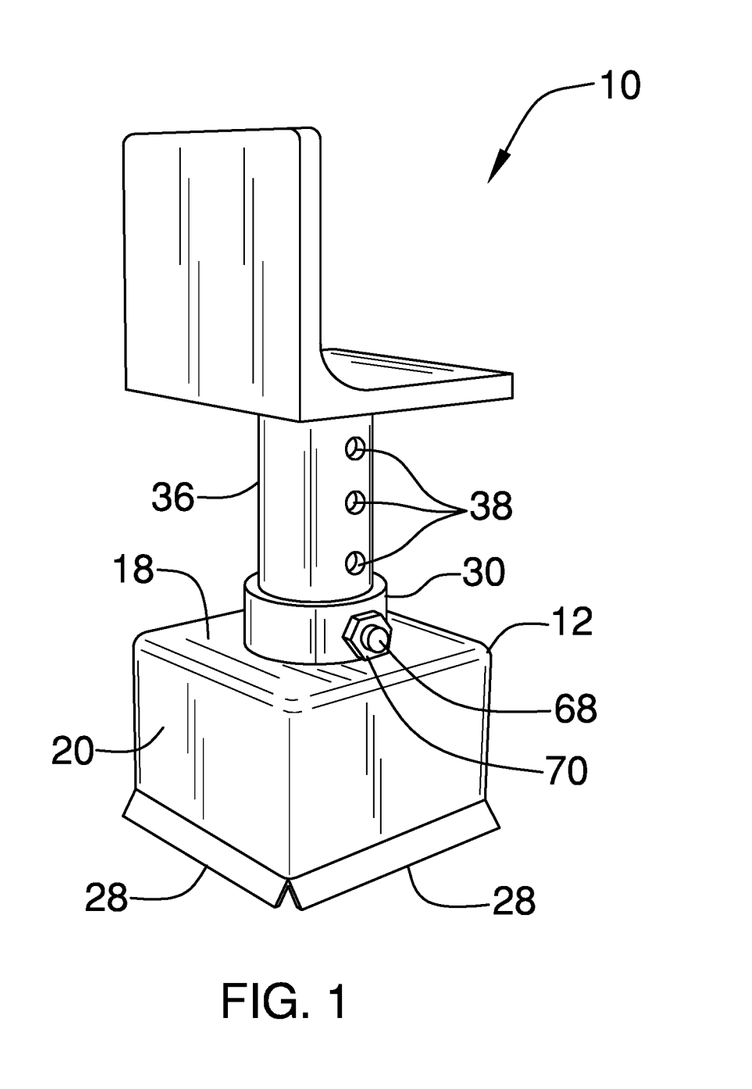
FIG. 1 is a perspective view of a dump trailer support assembly according to an embodiment of the disclosure.
Figure 2:
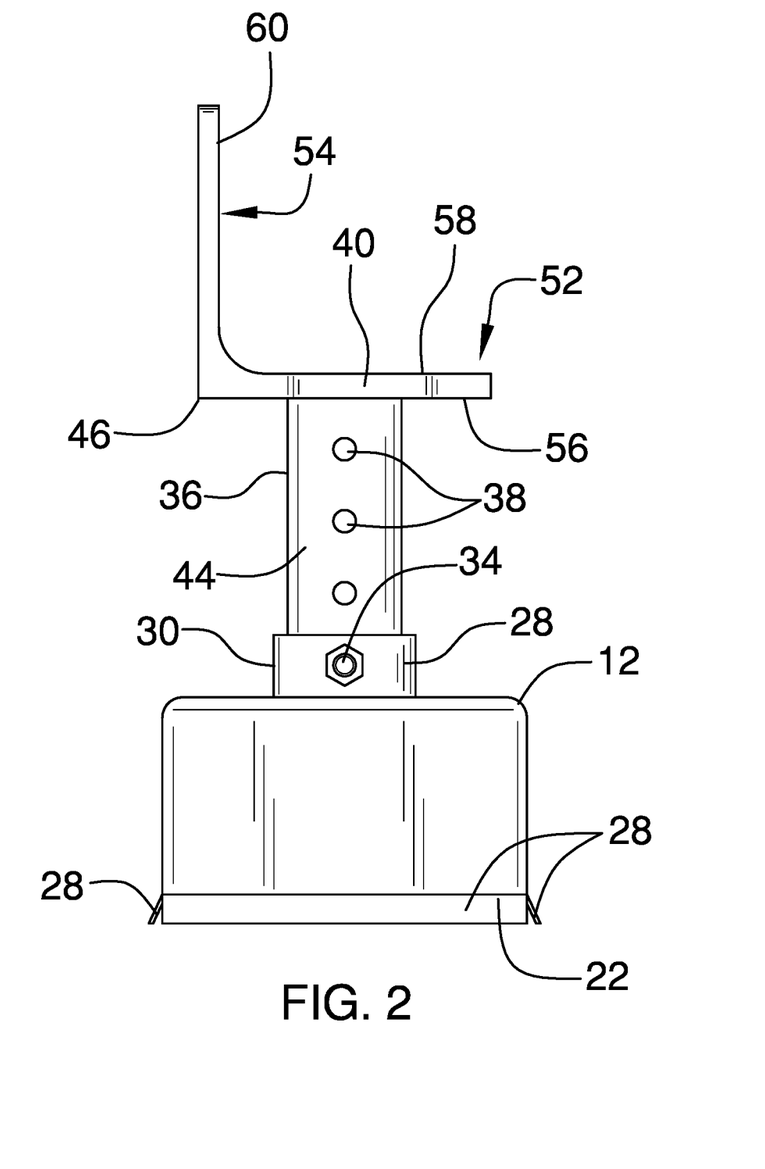
FIG. 2 is a left side view of an embodiment of the disclosure.
Figure 3:
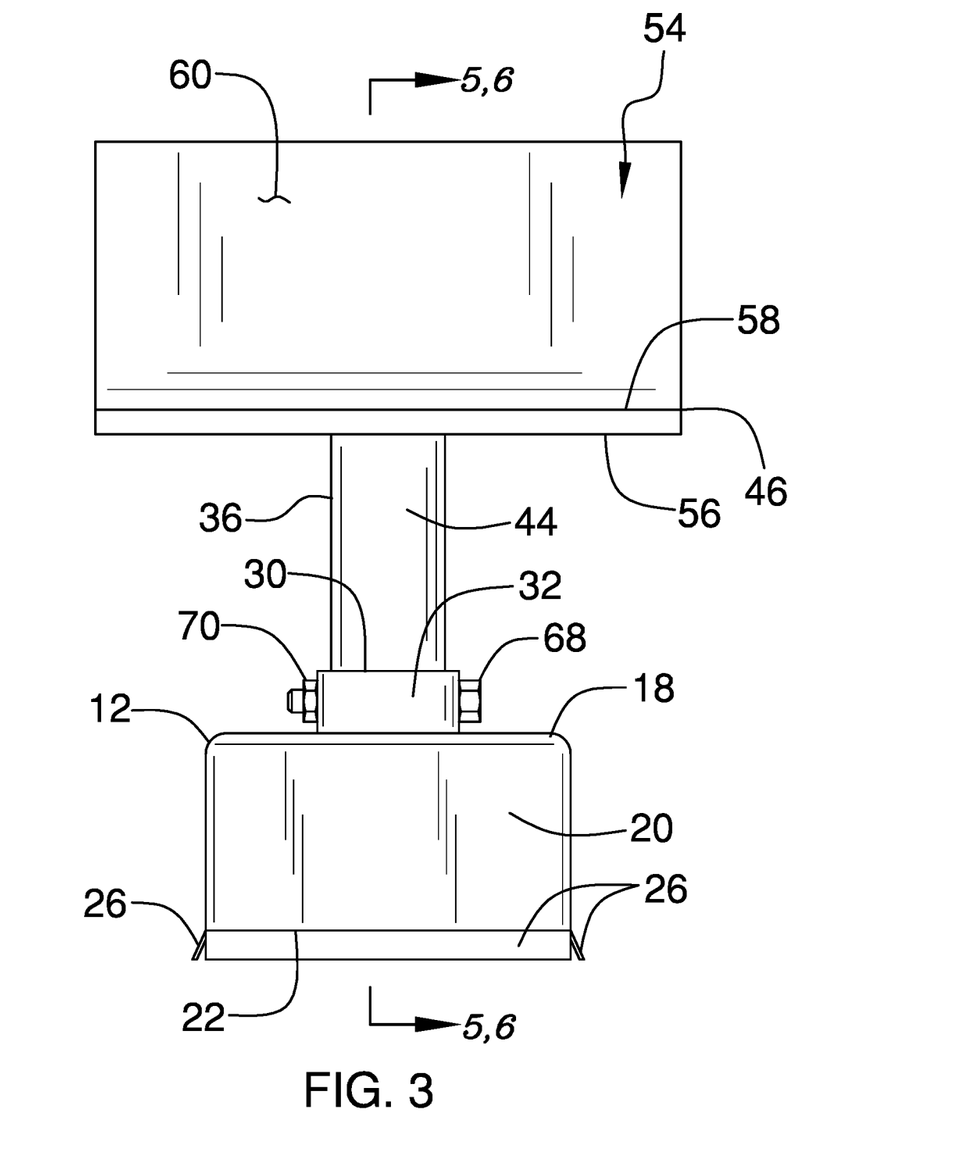
FIG. 3 is a back view of an embodiment of the disclosure.
Figure 4:
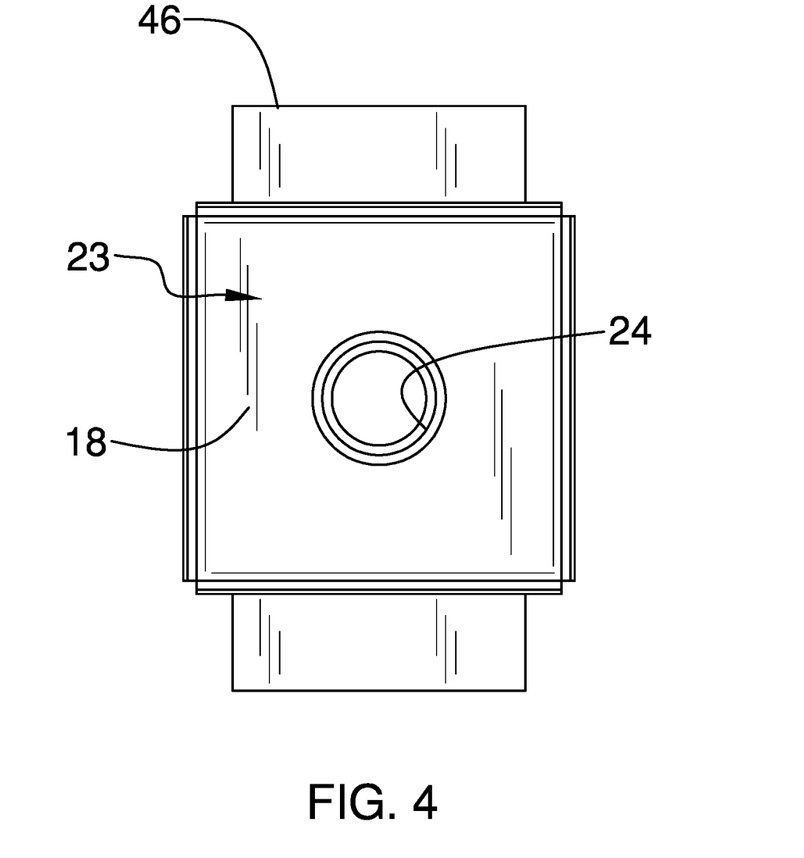
FIG. 4 is a bottom view of an embodiment of the disclosure.
Figure 5:
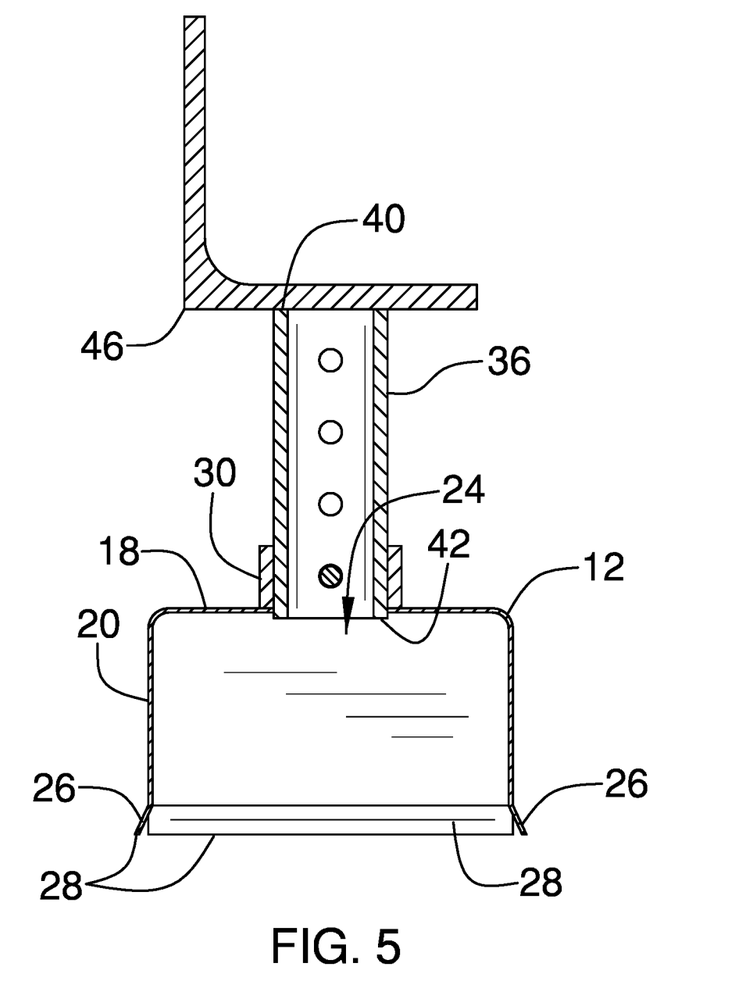
FIG. 5 is a cross sectional view taken along line 5-5 of FIG. 3 of an embodiment of the disclosure showing a shaft being extended in a collar.
Figure 6:
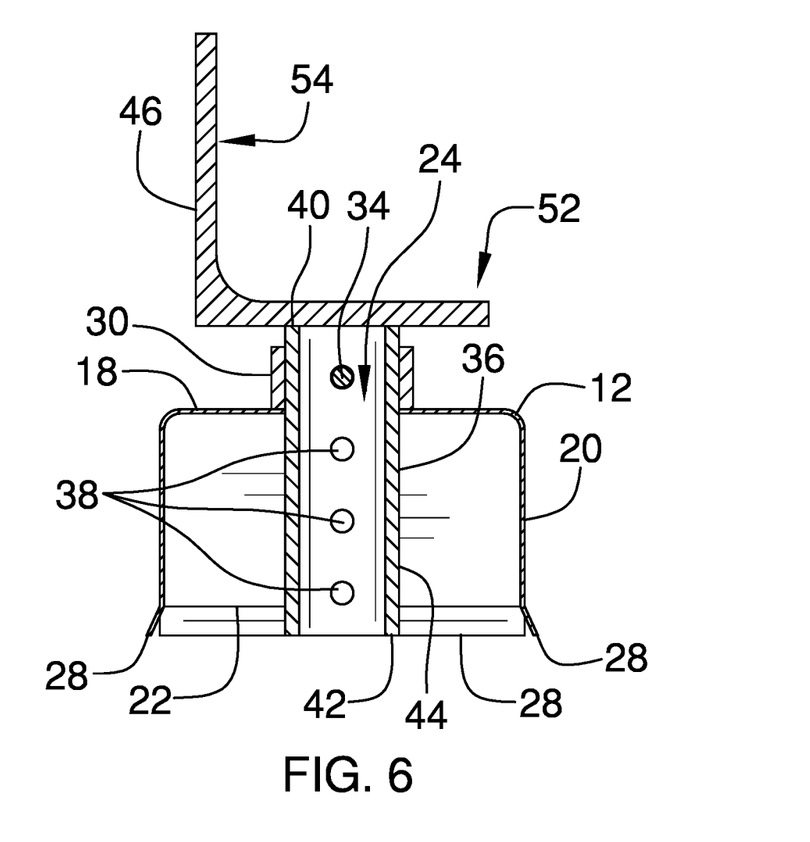
FIG. 6 is a cross sectional view taken along line 6-6 of FIG. 3 of an embodiment of the disclosure showing a shaft being retracted in a collar.
Figure 7:
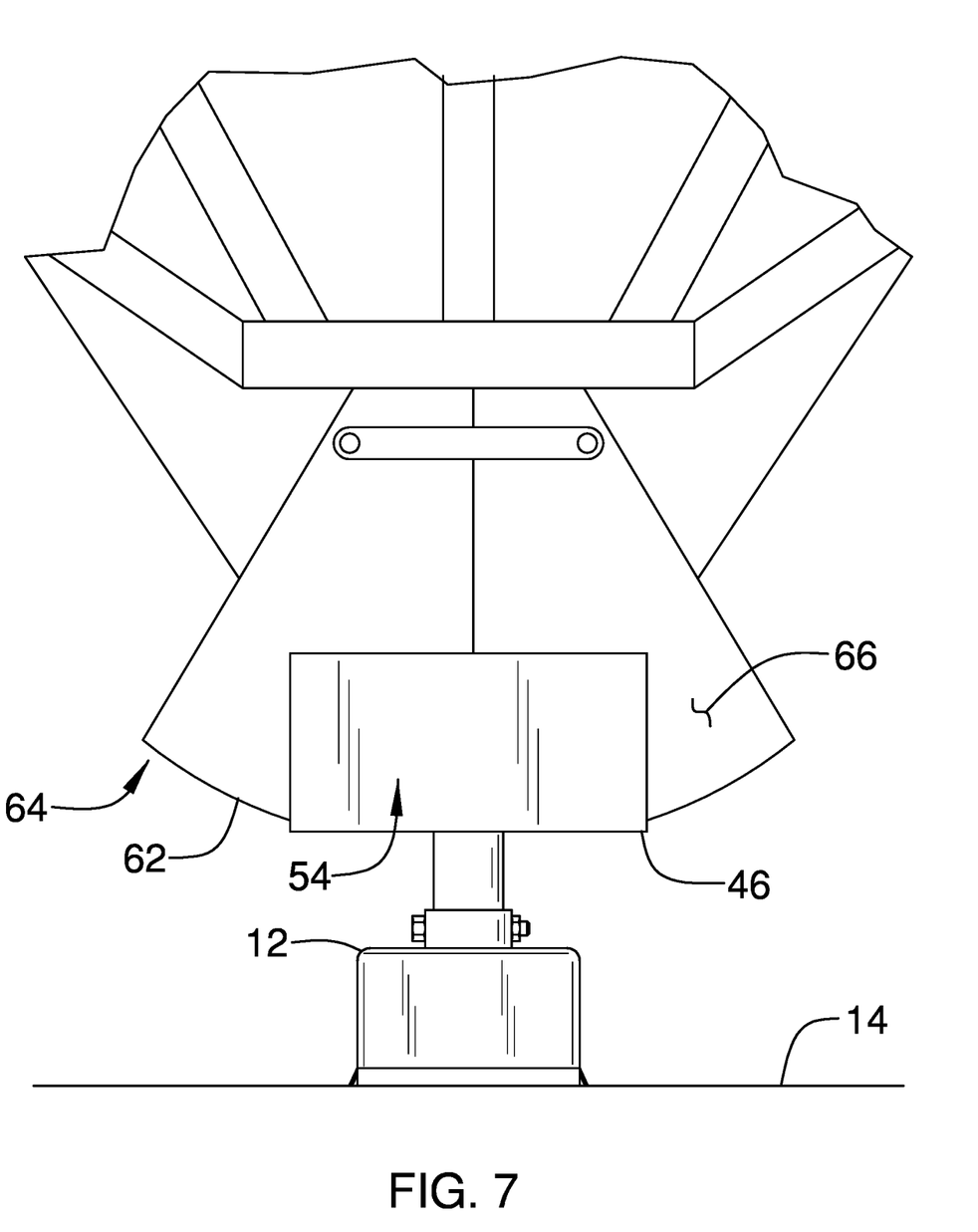
FIG. 7 is a front in-use view of an embodiment of the disclosure.
Figure 8:
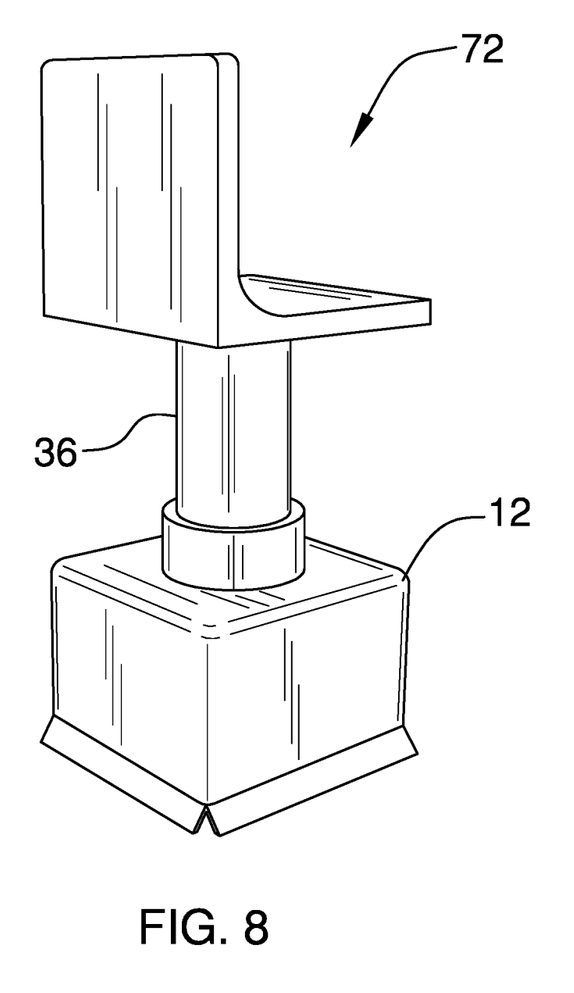
FIG. 8 is a perspective view of an alternative embodiment of the disclosure.
Figure 9:
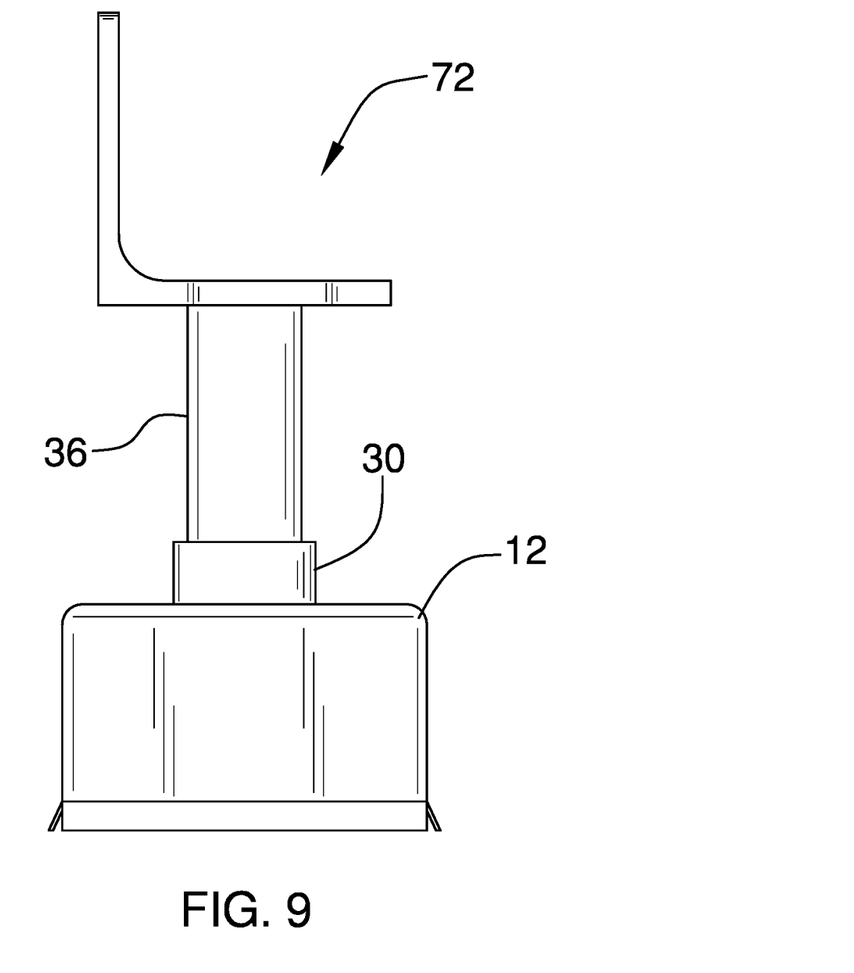
FIG. 9 is a left side view of an alternative embodiment of the disclosure.
Figure 10:
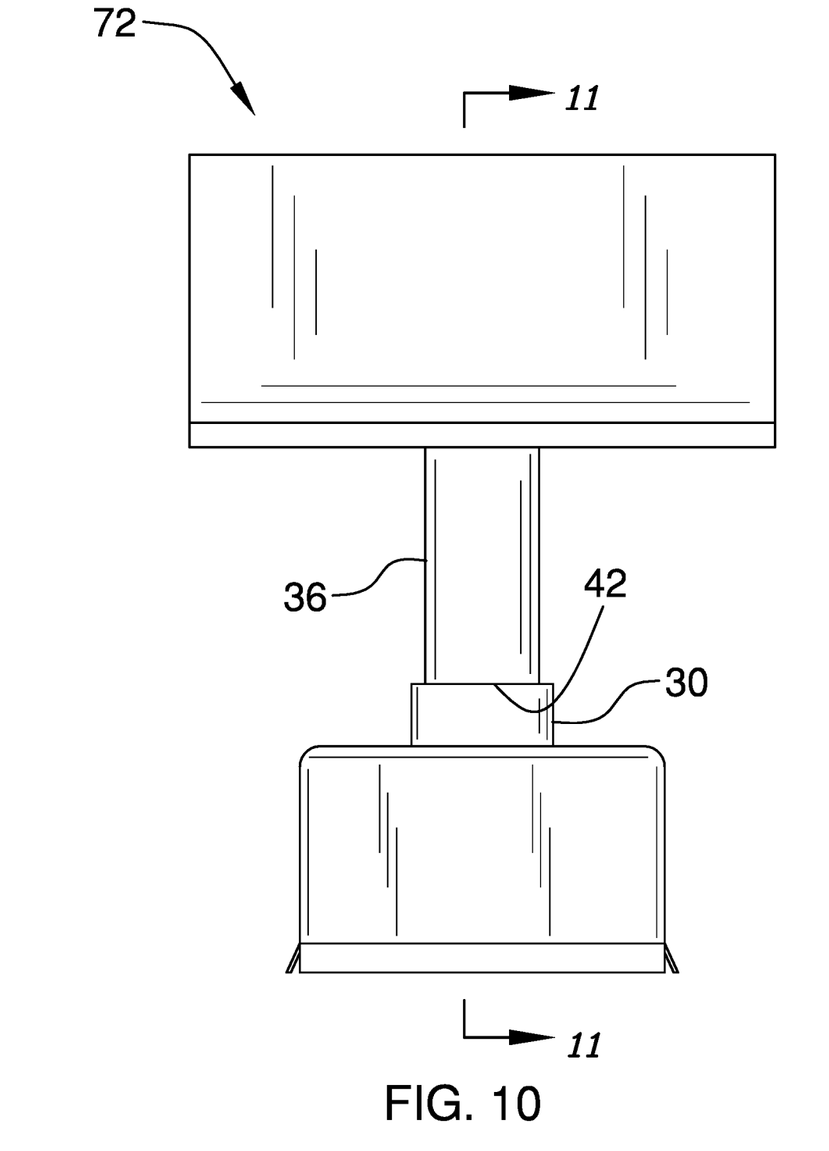
FIG. 10 is a back view of an alternative embodiment of the disclosure.
Figure 11:
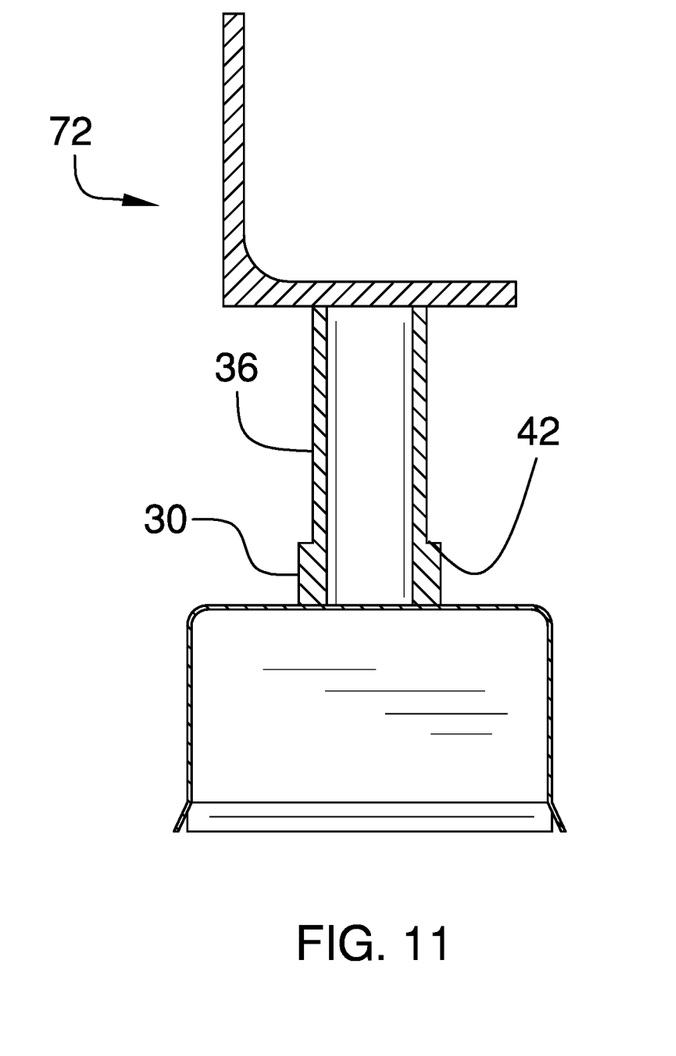
FIG. 11 is a cross sectional view taken along line 11-11 of an alternative embodiment of the disclosure.
Figure 12:
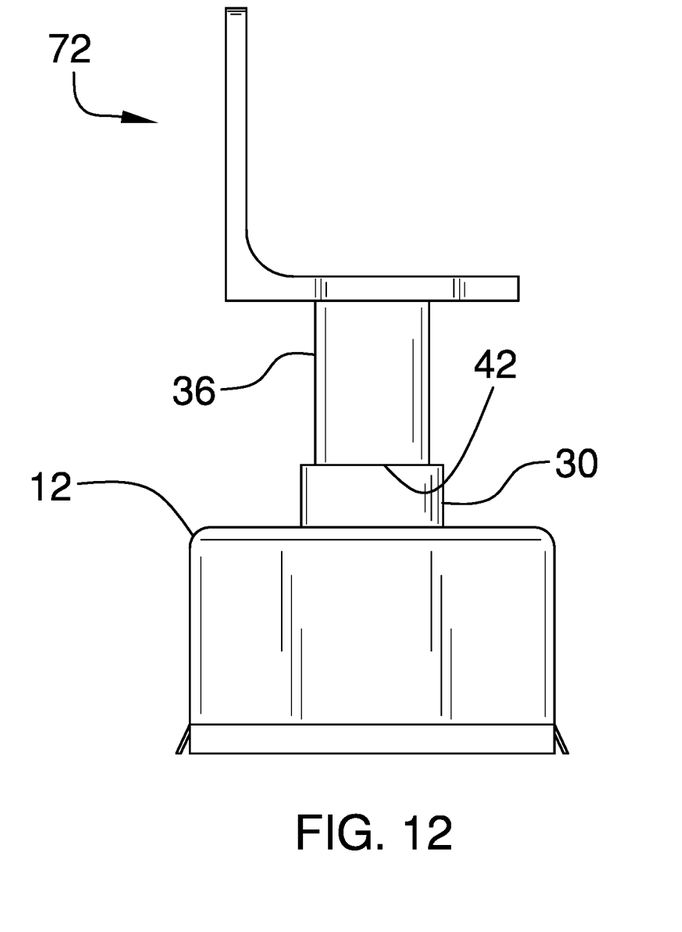
FIG. 12 is a left side view of an alternative embodiment of the disclosure showing a shaft of a reduced length.
Figure 13:
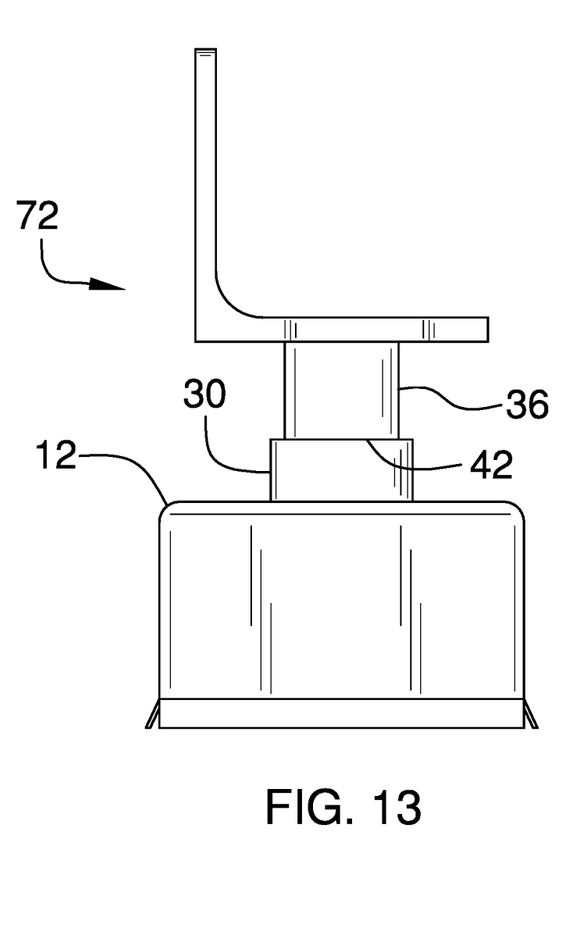
FIG. 13 is a left side view of an alternative embodiment showing a shaft of a minimum length.
Figure 14:
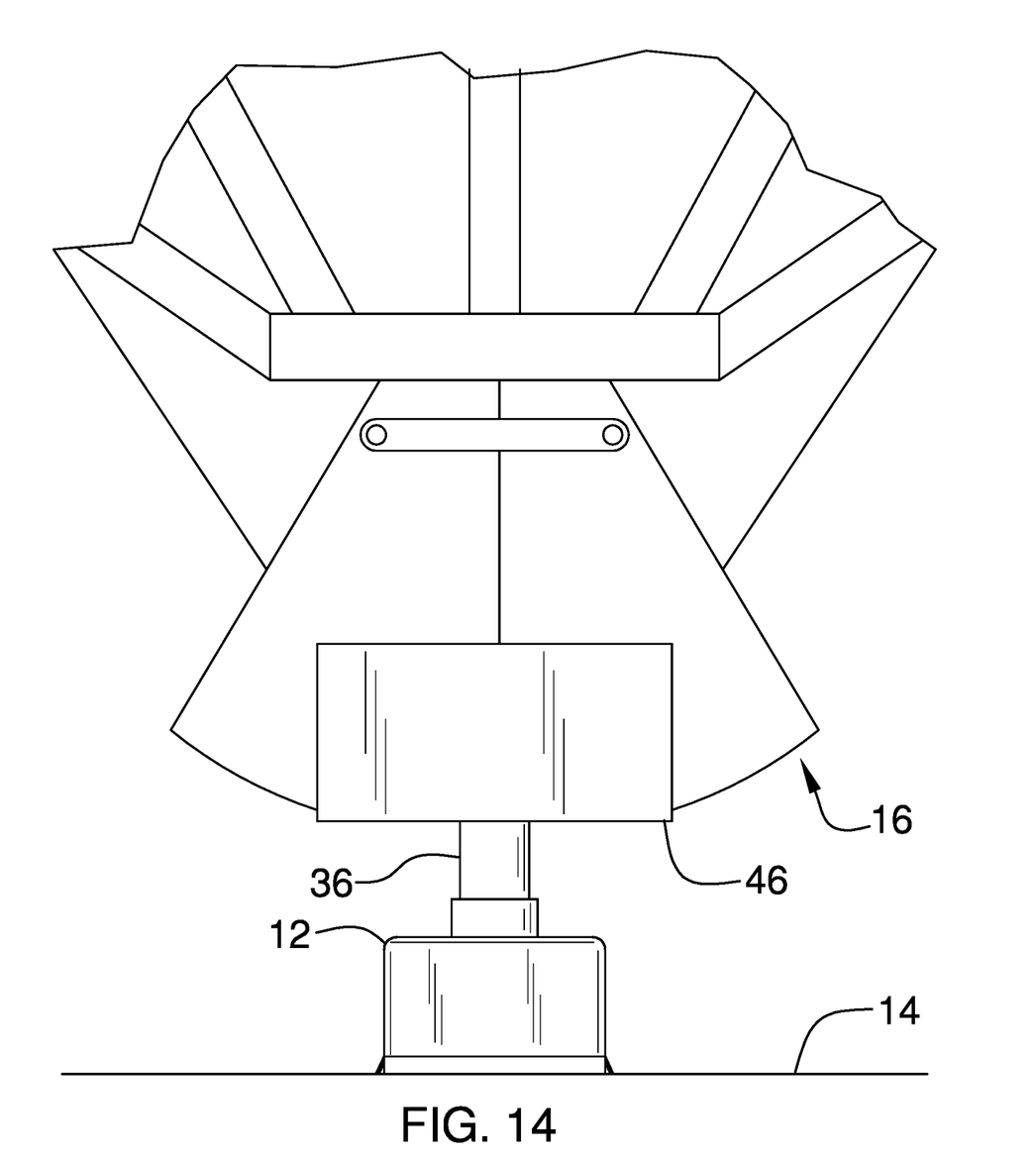
FIG. 14 is a front in-use view of an alternative embodiment of the disclosure.
Figure 15:
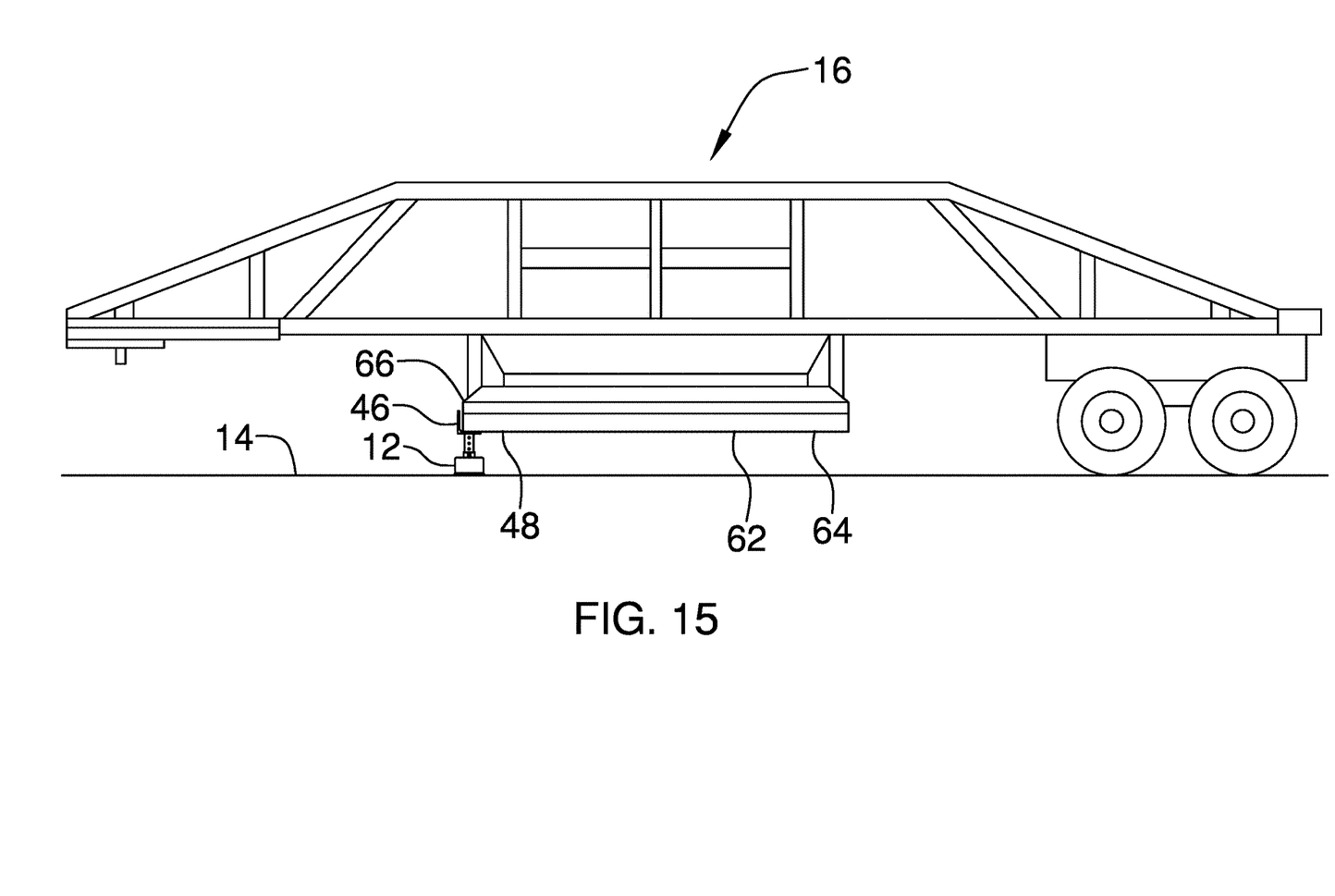
FIG. 15 is a left side in-use view of an embodiment of the disclosure.

With reference now to the drawings, and in particular to FIGS. 1 through 15 thereof, a new support device embodying the principles and concepts of an embodiment of the disclosure and generally designated by the reference numeral 10 will be described.

As best illustrated in FIGS. 1 through 15, the dump trailer support assembly 10 generally comprises a box 12 that can be positioned on a support surface 14 beneath a belly dump trailer 16. The belly dump trailer 16 may be a belly dump trailer 16 that is commonly employed on large scale excavation projects or the like which can dump cargo downwardly from the bottom of the belly dump trailer 16. The box 12 has a top wall 18 and an outer wall 20 extending downwardly therefrom, and the outer wall 20 has distal edge 22 with respect to the box 12 to define an opening 23 into the box 12. The top wall 18 has an opening 24 extending therethrough and the opening 24 is centrally positioned on the top wall 18.

The outer wall 20 has a plurality of flaps 26 each being coupled thereto and each of the flaps 26 is coupled to the distal edge 22 of the outer wall 20. Each of the flaps 26 extends along a full length of a respective one of four sides of the outer wall 20. Moreover, each of the flaps 26 has a bottom edge 28 that is spaced from the distal edge 22 of the outer wall 20 such that the bottom edge 28 of each of the flaps 26 can abut the support surface 14. Each of the flaps 26 angles outwardly from the outer wall 20 to inhibit the box 12 from tipping.

A collar 30 is coupled to and extends upwardly from the box 12 and the collar 30 is positioned on the top wall 18. The collar 30 surrounds the opening 24 extending through the top wall 18 and the collar 30 has an outer wall 32. Additionally, the outer wall 20 has an aperture 34 extending therethrough. A shaft 36 is slidably positioned in the collar 30 such that the shaft 36 can be slid upwardly or downwardly in the collar 30 and the shaft 36 has a plurality of holes 38 therein.

The shaft 36 has an upper end 40, a lower end 42 and an exterior wall 44 extending therebetween. The lower end 42 extends through the collar 30 and the opening 24 in the top wall 18 of the box 12 having the upper end 40 being exposed. In this way the shaft 36 is vertically oriented with respect to the box 12. Each of the plurality of holes 38 extends through the exterior wall 44, and the holes 38 are spaced apart from each other and are distributed between the upper end 40 and the lower end 42.

A support 46 is coupled to the shaft 36 thereby facilitating the support 46 to support a bottom 48 of the belly dump trailer 16 when the belly dump trailer 16 is not attached to a tractor 50. The support 46 is comprised of a magnetized material thereby facilitating the support 46 to magnetically engage the bottom 48 of the belly dump trailer 16. In this way the belly dump trailer 16 is inhibited from sliding on the support 46.

The support 46 comprises a first portion 52 that is oriented at a right angle with respect to a second portion 54. The first portion 52 has a lower surface 56 and a top surface 58, and the second portion 54 has a rear surface 60. The top surface 58 lies on a plane that is oriented perpendicular to the rear surface 60. In this way the top surface 58 can engage the bottom side 62 of a dumping mechanism 64 of the belly dump trailer 16 and the rear surface 60 can abut a vertical surface 66 of the dumping mechanism 64 of belly dump trailer 16. Thus, the belly dump trailer 16 is inhibited from moving on the support 46. The upper end 40 of the shaft 36 is coupled to the lower surface 56 of the first portion 52 and the upper end 40 is centrally located on the lower surface 56.

A bolt 68 is provided that is extendable through the collar 30 and a respective one of the holes 38 in the shaft 36 for spacing the support 46 a selected distance from the box 12. In this way the support 46 can accommodate a variety of heights of belly dump trailers. A nut 70 is provided and the nut 70 can be threaded on the bolt 68 when the bolt 68 is extended through the collar 30 and the shaft 36. In this way the bolt 68 is inhibited from being removed from the collar 30 and the shaft 36.

In an alternative embodiment 72 as is most clearly shown in FIGS. 8 through 14, the lower end 42 of the shaft 36 is coupled to the collar 30 such that the shaft 36 is immovable on the collar 30. In this way the shaft 36 can support 46 the weight of the belly dump trailer 16. As is most clearly shown in FIGS. 13 and 14, the shaft 36 may have a length of at least 8.0 inches. As is most clearly shown in FIGS. 8 through 12, the shaft 36 may has a length of at least 10.0 inches. In this way the shaft 36 of the two different heights in the alternative embodiment 72 can accommodate heights that are common between the dumping mechanism of the belly dump trailer 16 and the ground.

In use, the box 12 is positioned beneath the dumping mechanism 64 of the belly dump trailer 16 and the shaft 36 is adjusted to the necessary height to abut the support 46 against the dumping mechanism 64 of the belly dump trailer 16. In this way the belly dump trailer 16 is supported when the tractor 50, to which the belly dump trailer 16 is coupled, is un-coupled and driven away from the belly dump trailer 16. Additionally, the support 46 magnetically engages the belly dump trailer 16 to inhibit the belly dump trailer 16 from sliding off of the support 46 when the tractor 50 is driven away from the belly dump trailer 16. Moreover, the support 46, shaft 36 and box 12 facilitate the belly dump trailer 16 to be retained at the appropriate height to facilitate the tractor 50 to re-couple to the belly dump trailer 16 with limited effort.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dump trailer support assembly for supporting a belly dump trailer when the belly dump trailer is not attached to a tractor, said assembly comprising:
  a box being configured to be positioned on a support surface beneath a belly dump trailer;
  a collar being coupled to and extending upwardly from said box;
  a shaft being slidably positioned in said collar such that said shaft can be slid upwardly or downwardly in said collar, said shaft having a plurality of holes therein;
  a support being coupled to said shaft wherein said support is configured to support a bottom of the belly dump trailer when the belly dump trailer is not attached to a tractor, said support being comprised of a magnetized material wherein said support is configured to magnetically engage the bottom of the belly dump trailer to inhibit the belly dump trailer from sliding on the support;

a bolt being extendable through said collar and a respective one of said holes in said shaft for spacing said support a selected distance from said base wherein said support is configured to accommodate a variety of heights of belly dump trailers;

a nut being threadably engageable to said bolt when said bolt is extended through said collar and said shaft for inhibiting said bolt from being removed from said collar and said shaft; and wherein said box has a top wall and an outer wall extending downwardly therefrom, said outer wall having distal edge with respect to said box to define an opening into said box, said outer wall having a plurality of flaps each being coupled thereto, each of said flaps being coupled to said distal edge of said outer wall, each of said flaps extending along a full length of a respective one of four sides of said outer wall, said top wall having an opening extending therethrough, said opening being centrally positioned on said top wall.

2. The assembly according to claim 1, wherein each of said flaps has a bottom edge being spaced from said distal edge of said outer wall wherein said bottom edge is configured to abut the support surface, each of said flaps angling outwardly from said outer wall wherein said plurality of flaps is configured to inhibit said box from tipping.

3. The assembly according to claim 1, wherein said collar is positioned on said top wall, said collar surrounding said opening extending through said top wall, said collar having an outer wall, said outer wall having an aperture extending therethrough.

4. The assembly according to claim 3, wherein said shaft has an upper end, a lower end and an exterior wall extending therebetween, said lower end extending through said collar and said opening in said top wall of said box having said upper end being exposed, each of said plurality of holes extending through said exterior wall, said plurality of holes being spaced apart from each other and being distributed between said upper end and said lower end.

5. The assembly according to claim 4, wherein said support comprises a first portion being oriented at a right angle with respect to a second portion, said first portion having a lower surface and a top surface, said second portion having a rear surface, said top surface lying on a plane being oriented perpendicular to said rear surface wherein said top surface is configured to engage the bottom of the belly dump trailer and said rear surface is configured to abut a vertical surface of the belly dump trailer thereby restricting movement of the belly dump trailer on said support.

6. The assembly according to claim 5, wherein said lower surface of said first portion has said upper end of said shaft being coupled thereto, said upper end being centrally located on said lower surface.

7. A dump trailer support assembly for supporting a belly dump trailer when the belly dump trailer is not attached to a tractor, said assembly comprising:

a box being configured to be positioned on a support surface beneath a belly dump trailer, said box having a top wall and an outer wall extending downwardly therefrom, said outer wall having distal edge with respect to said box to define an opening into said box, said top wall having an opening extending therethrough, said opening being centrally positioned on said top wall, said outer wall having a plurality of flaps each being coupled thereto, each of said flaps being coupled to said distal edge of said outer wall, each of said flaps extending along a full length of a respective one of four sides of said outer wall, each of said flaps having a bottom edge being spaced from said distal edge of said outer wall wherein said bottom edge is configured to abut the support surface, each of said flaps angling outwardly from said outer wall wherein said plurality of flaps is configured to inhibit said box from tipping;

a collar being coupled to and extending upwardly from said box, said collar being positioned on said top wall, said collar surrounding said opening extending through said top wall, said collar having an outer wall, said outer wall having an aperture extending therethrough;

a shaft being slidably positioned in said collar such that said shaft can be slid upwardly or downwardly in said collar, said shaft having a plurality of holes therein, said shaft having an upper end, a lower end and an exterior wall extending therebetween, said lower end extending through said collar and said opening in said top wall of said box having said upper end being exposed, each of said plurality of holes extending through said exterior wall, said plurality of holes being spaced apart from each other and being distributed between said upper end and said lower end;

a support being coupled to said shall wherein said support is configured to support a bottom of the belly dump trailer when the belly dump trailer is not attached to a tractor, said support being comprised of a magnetized material wherein said support is configured to magnetically engage the bottom of the belly dump trailer to inhibit the belly dump trailer from sliding on the support, said support comprising a first portion being oriented at a right angle with respect to a second portion, said first portion having a lower surface and a top surface, said second portion having a rear surface, said top surface lying on a plane being oriented perpendicular to said rear surface wherein said top surface is configured to engage the bottom of the belly dump trailer and said rear surface is configured to abut a vertical surface of the belly dump trailer thereby restricting movement of the belly dump trailer on said support, said lower surface of said first portion having said upper end of said shaft being coupled thereto, said upper end being centrally located on said lower surface;

a bolt being extendable through said collar and a respective one of said holes in said shall for spacing said support a selected distance from said base wherein said support is configured to accommodate a variety of heights of belly dump trailers; and a nut being threadably engageable to said bolt when said bolt is extended through said collar and said shaft for inhibiting said bolt from being removed from said collar and said shaft.

8. The assembly according to claim 7, wherein said lower end of said shaft is coupled to said collar such that said shaft is immovable on said collar wherein said shaft is configured to support the weight of the belly dump trailer.

9. The assembly according to claim 8, wherein said shaft has a length of at least 8.0 inches.

10. The assembly according to claim 8, herein said shaft has a length of at least 10.0 inches.

* * * * *